United States Patent
Plickert et al.

(10) Patent No.: US 6,430,326 B1
(45) Date of Patent: Aug. 6, 2002

(54) MODULE FOR PARALLEL OPTICAL DATA TRANSMISSION

(75) Inventors: Volker Plickert, Brieselang; Lutz Melchior, Berlin, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/563,394

(22) Filed: May 1, 2000

(30) Foreign Application Priority Data

Apr. 29, 1999 (DE) .......................... 199 20 638

(51) Int. Cl.[7] .................................. G02B 6/12
(52) U.S. Cl. ............................. 385/14; 385/88; 385/92
(58) Field of Search ................... 385/14, 88–94

(56) References Cited

U.S. PATENT DOCUMENTS 5,416,871 A * 5/1995 Takahashi et al. ............ 385/88

FOREIGN PATENT DOCUMENTS

DE 196 47 685 C1 3/1998
DE 197 14 170 C1 7/1998

* cited by examiner

Primary Examiner—Phan T. H. Palmer
(74) Attorney, Agent, or Firm—Laurence A. Greenberg; Werner H. Stemer; Gregory L. Mayback

(57) ABSTRACT

A module contains a plurality of optical transducers with optically active zones. The transducers are assigned an integrated circuit. A coupling assembly contains a plurality of optical channels running between an inner optical interface with the optically active zones and an outer interface. The transducers, the circuit and the coupling assembly are disposed together on a lead frame having connections for external contact-making.

5 Claims, 2 Drawing Sheets

MODULE FOR PARALLEL OPTICAL DATA TRANSMISSION

BACKGROUND OF THE INVENTION

Field of the Invention

The invention is in the field of multi-channel data transmission using optical signals that are transmitted from a transmitter to a receiver via a plurality of parallel optical data transmission channels. The invention relates to a module for parallel optical data transmission having a plurality of electro-optical transducers with optically active zones. At least one integrated circuit is assigned to the electro-optical transducers, and a coupling assembly with a plurality of optical channels runs between an inner optical interface with the optically active zones and an outer optical interface.

In the context of the present invention, the electro-optical transducer is understood to be both a transmitting and a receiving element (e.g. light-emitting diodes, surface emitting laser diodes or photo diodes). Such transducers have (as the transmitter) one or more light-radiating zones and (as the receiver) optically sensitive zones. In a generalized manner, these zones will be referred to below as optically active zones.

German Patent DE 196 47 685 C1 discloses a coupling configuration with a carrier substrate e.g. made of silicon, the substrate having trenches for accommodating optical waveguide end portions. A plurality of laser transmitters formed in a common component (so-called array) are disposed with their light radiating (optically active) zones facing the end portions on the top side of the carrier. The end of the carrier is beveled together with the end areas of the end portions in such a way that light emitted by the zones is mirrored via the end areas into the respective optical waveguides. In a further course of the optical waveguides, the latter may be combined to form a fiber-optic cable or fiber-optic strip. The problem area appertaining to the mounting and the protection of the known coupling configurations against environmental influences is discussed in German Patent DE 196 47 685 C1 only insofar as a potting material can be provided in order to fill any gaps between the transmitter component and the end portions.

German Patent DE 197 14 170 C1 discloses an electro-optical module of the type mentioned in the introduction which, for parallel optical data transmission, contains a plurality of electro-optical transducers with optically active zones. The electro-optical transducers may be configured as transmitters and are connected to the outputs of an integrated electrical drive circuit. In accordance with the output signals of the drive circuit, the active zones are individually excited for targeted light emission. In the case of electro-optical transducers with optically sensitive zones (receivers), the assigned integrated circuit could be a preamplifier stage.

The known module furthermore contains an optical coupling assembly containing a multiplicity of optical waveguide portions corresponding to the number of transducers. One end of each of the portions is assigned to a respective optically active zone in such a precise manner as to produce optical coupling (internal optical interface) with the lowest possible degree of attenuation.

The respective other ends of the portions extend as far as an outer end area of the coupling assembly, which serves as an optical interface for the purpose of further optical coupling, e.g. with a connector.

The transducers and the integrated circuit assigned thereto are disposed on a base plate and electrically connected to one another via bonding wires. Further bonding wires lead from the circuit to a circuit board carrying conductor track connections. For its part, the circuit board is mounted on the base plate. A region between the coupling assembly and the transducers, the transducers, the integrated circuit and a region of the printed circuit board which faces the circuit are protected by a potting material which is applied partially to the base plate within a potting bead.

In order to be able to mount the known module for example on a circuit board and make contact with it, a multiplicity of further mounting and contact-making steps are necessary. Thus, by way of example, the conductor track connections have to be connected to connections with which contact can be made externally. Depending on the site where the known module is used, it may additionally be necessary to provide further protective measures, for example an outer housing.

SUMMARY OF THE INVENTION

It is accordingly an object of the invention to provide a module for parallel optical data transmission which overcomes the above-mentioned disadvantages of the prior art devices of this general type, which can be produced at low cost and allows good protection of its components in conjunction with simple optical and electrical external connection possibilities.

With the foregoing and other objects in view there is provided, in accordance with the invention, a module for parallel optical data transmission, including:

a plurality of electro-optical transducers with optically active zones;

at least one integrated circuit connected to the electro-optical transducers;

a coupling assembly having a plurality of optical channels each with a first end and a second end, the first end of the optical channels are disposed in a region of the optically active zones and define an inner optical interface there-between, the second end of the optical channels defining part of an outer optical interface; and a lead frame having electrical connections for providing an external contact, the electra-optical transducers, the integrated circuit and the coupling assembly are disposed together on the lead frame.

In the case of the module of the type mentioned in the introduction, the object is achieved according to the invention by virtue of the fact that the electra-optical transducers, the integrated circuit and the coupling assembly are disposed together on the lead frame having the electrical connections for making external contact with the module.

An essential aspect of the module according to the invention is that the transducers, the integrated circuit and the coupling assembly are disposed together on the supporting lead frame, and that the externally accessible electrical connections are provided as integral parts of the lead frame. Besides being comparatively simple and cost-effective to produce, the module realizes very complex functions, which may include not only the electro-optical signal conversion but also coding or multiplex functions.

A further essential aspect of the invention is that the aforementioned components of the module can be mounted on the lead frame using controlled standard technologies (e.g. chip bonding and wire bonding). Preferably, the coupling assembly is positioned and fixed after the mounting of the transducers and the circuit on the lead frame relative to the optically active zones in such a way that the inner optical interface has the highest possible coupling efficiency. A possible gap in the interface region between the coupling assembly and the optically active zones is preferably filled with a material, preferably a polymer, which is transmissive for the light wavelengths used for the data transmission.

The connections may preferably be configured for surface mounting, with the result that the module can be mounted, and contact-connected, together with further surface-mountable devices (SMD) on a common circuit board, such as a computer board, for example. More specifically, the electrical connections are configured for surface mounting.

A configuration of the module according to the invention that is particularly reliable and insensitive to external influences can be achieved by the lead frame with the electro-optical transducers, the integrated circuit and the coupling assembly being surrounded by an enveloping compound.

To ensure that the heat loss that is produced internally during the operation of the module can be distributed or dissipated as well as possible, a preferred configuration of the invention provides for a region of the lead frame to be configured as a heat sink, which is externally accessible.

Other features which are considered as characteristic for the invention are set forth in the appended claims.

Although the invention is illustrated and described herein as embodied in a module for parallel optical data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
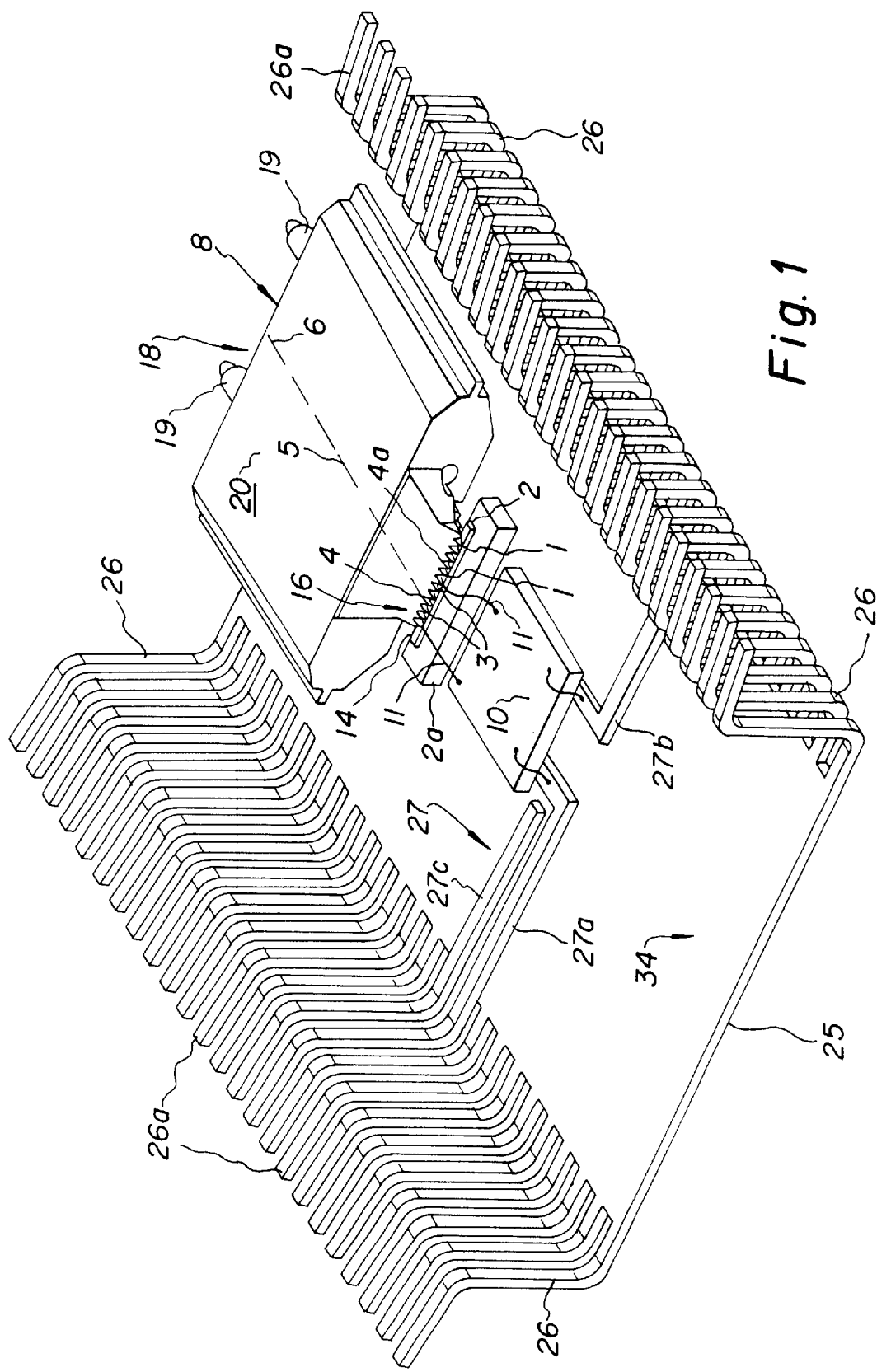
FIG. 1 is a diagrammatic perspective view of a module with its essential components as seen from an underside and according to the invention.

In all the figures of the drawing, sub-features and integral parts that correspond to one another bear the same reference symbol in each case. Referring now to the figures of the drawing in detail and first, particularly, to FIG. 1 thereof, there is shown a module having a plurality (12 in the exemplary embodiment) of electro-optical transducers 1 formed in a common substrate 2 (array). In the following description of the exemplary embodiment, it is assumed that the transducers 1 are transmitters. In a manner that is immediately evident to the person skilled in the art, the transducers 1 could also be configured as receivers and correspondingly reconvert optical signals that have been transmitted to the module into electrical signals.

The transducers 1 each have an optically active zone 3, to which one end 4 of an optical waveguide portion 5 is assigned in each case. Only an end area 4a of each of the ends 4 can be discerned externally in the illustration in FIG. 1. The optical waveguide portions 5, which run parallel and are provided in a corresponding number (12), end as optical channels with their respective other end 6 at a coupling end area 8 of the module. For the sake of clarity, only one optical waveguide portion 5 is illustrated (by a broken line) in FIG. 1.

The transducers 1 are driven by output signals generated by an integrated electrical circuit 10 and passing via bonding wires 11 to corresponding connections 14 of the transducers 1. When the transducers 1 are driven, they emit light vertically upward (in the illustration as shown in FIG. 1), which light is reflected at the inclined end areas 4 of the optical waveguide portions 5 and is thus transported along a longitudinal extent of the optical waveguide portions 5 as far as the end area 8. A transition region between the optically active zones 3 of the transducers 1 and the respectively assigned ends 4 of the optical waveguide portions 5 thus forms an internal optical interface 16. An external interface 18 for an element that is not illustrated, for example a connector, is provided at the end area 8 of the module. For this purpose, mechanical orientation elements 19 in the form of centering pins are present, which serve for exactly orienting the respectively corresponding mating coupling elements (not shown in FIG. 1) with respect to the end 6 of the optical waveguide portions. The optical waveguide portions 5 are parts of a coupling assembly 20, the end area of which forms the end area 8 of the module.

The electro-optical transducers 1, the integrated circuit 10 and the coupling assembly 20 are disposed together on a lead frame 25. The lead frame 25 has an essentially U-shaped configuration with outwardly bent free ends 26a of electrical connections or terminal legs 26. The connections 26 continue in a central region of the lead frame 25 as so-called inner conductor tracks ("inner leads") 27. It is only in order to simplify the illustration that the inner conductor tracks 27 or conductor leads are not all illustrated in detail in FIG. 1. only by way of example, conductor tracks or conductor leads 27a, 27b, 27c are shown. In actual fact, the conductor leads 27a, 27b, 27c are insulated from one another in a manner known per se and lead into the vicinity of the circuit 10 for the purpose of contact-making, for example.

During the mounting of the module, in a first work operation, the circuit 10 (e.g. a drive circuit in the case of a transmitter and a preamplifier circuit in the case of a receiver) and the transducer array 2 with an array carrier 2a are mounted on the carrier frame or lead frame 25. The coupling element 20 is subsequently adjusted with regard to the optically active zones 3 and fixed in the position of maximum optical coupling.

Figure 2:
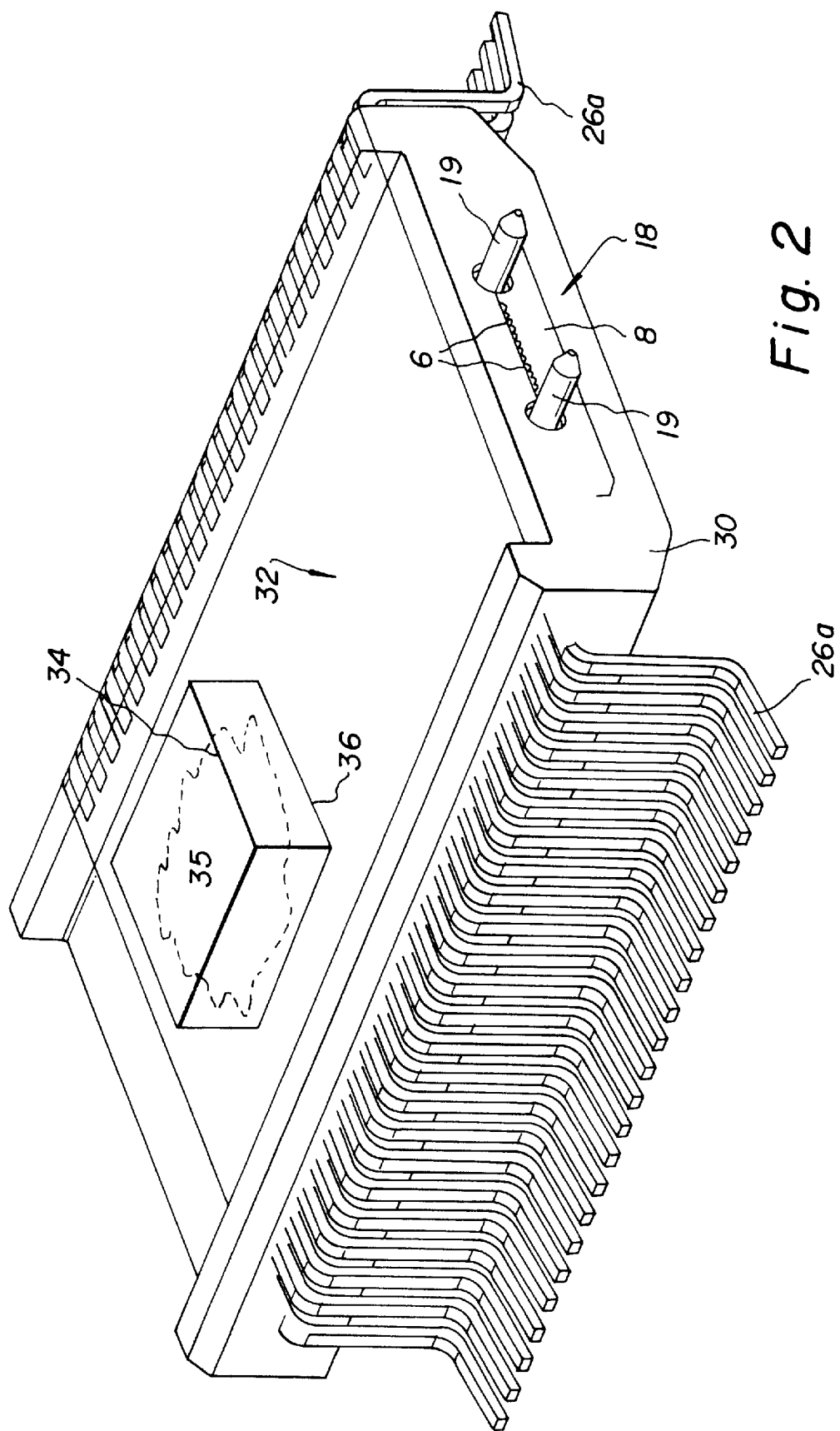
FIG. 2 is a perspective view of the module surrounded by an enveloping compound.

The lead frame 25 with the above-mentioned components is subsequently surrounded by a filling or enveloping compound 30 (FIG. 2), thereby producing an essentially completely encapsulated module. However, the module is free from the filling compound 30 on its rear side 32 and on the end 8, thus at the interface 18. This makes it possible, on the one hand, for at least regions 34 of the lead frame 25 which serve as a heat sink 35 for heat dissipation purposes to be made externally accessible. In a particularly preferable manner, a cooling element 36 may be mounted directly on the rear side 32, the cooling element 36 being connected to the heat sink 35 via a thermal interface. The end 8 is free of the filling compound 30 at least in a region of the centering pins 19 and the ends 6 forming the external or outer optical interface 18. This ensures an exact stop of a connector (not shown in FIG. 2) with mating coupling elements that are to be assigned to the ends 6. The outer ends 26a ("outer leads") of the connections 26 are bent and consequently allow preferred surface mounting. The external optical interface 18 is preferably equipped compatibly for coupling with a so-called MT connector.

We claim:

1. A module for parallel optical data transmission, comprising:

a plurality of electro-optical transducers with optically active zones;

at least one integrated circuit connected to said electro-optical transducers;

a coupling assembly having a plurality of optical channels each with a first end and a second end, said first end of said optical channels disposed in a region of said optically active zones and defining an inner optical interface there-between, said second end of said optical channels defining part of an outer optical interface; and a lead frame having a rear side and electrical connections for providing an external contact, said electro-optical transducers, said integrated circuit and said coupling assembly being disposed together on said lead frame, and said lead frame having a region disposed on said rear side of said lead frame being configured as an externally accessible heat sink.

2. The module according to claim 1, wherein said electrical connections are configured for surface mounting.

3. The module according to claim 1, including an enveloping compound surrounding said lead frame with said electro-optical transducers, said integrated circuit and said coupling assembly disposed thereon.

4. The module according to claim 1, including a cooling element directly disposed on said rear side of said lead frame.

5. The module according to claim 1, wherein said rear side of said lead frame forms a planar surface.

* * * * *